United States Patent Office 3,437,494
Patented Apr. 8, 1969

3,437,494
PROCESS FOR MAKING CHEMICALLY-ACIDIFIED SOUR CREAM TYPE PRODUCT
Ira Loter, Fair Lawn, and John E. Long, Murray Hill, N.J., assignors to Diamond Shamrock Corporation, a corporation of Delaware
No Drawing. Filed May 5, 1965, Ser. No. 453,518
Int. Cl. A23c 13/12
U.S. Cl. 99—144                                 7 Claims

ABSTRACT OF THE DISCLOSURE

Process for making a chemically fermented sour cream type product by preparing an emulsion of fat, emulsifier having a melting point below 140° F., and water, adding protein, homogenizing while heating and adding an edible non-toxic acid to provide a pH of 3.5 to 6. The emulsion also contains colloidal stabilizers (gums, starch, flour, etc.) and may also include ammonium or alkali metal salts of inorganic phosphates and edible organic acids (e.g. citric, acetic acids).

---

This invention relates to new and novel sour cream type products and flavored dips made therefrom and a new and novel method of preparing these products. More particularly, this invention pertains to a new and novel sour cream type product and flavored dips made therefrom, made by the direct chemical acidification of protein containing vegetable or animal fats.

Sour cream and flavored dips made therefrom can be produced by the direct chemical acidification of milk in accordance with the process disclosed in U.S. Ser. No. 184,517, Edwards, filed Apr. 2, 1962. Generally, this process is carried out by first intimately introducing an organic colloidal stabilizer into milk having a butterfat content of from about 7% to about 35% and a non-fat solids content ranging from about 7% to about 13%, and then adding a non-toxic acid or acid liberating compound such as an acidogen in an amount sufficient to reduce the pH to a range of from about 3.5 to about 6 to produce an acidity level of from about 0.5% to about 1.1% by weight of the final product, calculated as titratable lactic acid, while maintaining the butterfat content of the milk at approximately the same level prior to acidification. In this manner, a smooth, homogeneous, uniform sour cream product is produced by chemical acidification quickly and continuously without the disadvantages inherent in the process of biologically acidifying milk by fermentation methods.

Various attempts have been made to produce sour cream type products by direct chemical acidification from animal and/or vegetable fats and oils, which contain vegetable or animal protein rather than from milk which contains butterfat. These attempts have been made because of the relatively low cost and beneficial properties of vegetable and/or animal fats and oils as compared to milk containing butterfat. However, these attempts have been unsuccessful due to the fact that workers in the field have found it impossible when animal and/or vegetable fats and oils are used to obtain the aforementioned desired acidity level of sour cream at a pH of from about 3.5 to 6. Unless this acidity level is obtained, the sour cream type products obtained by the direct acidification of animal and/or vegetable fats and oils containing animal or vegetable protein do not have the proper taste of sour cream. In order to overcome this problem, attempts have been made to produce sour cream type products from animal and/or vegetable fats and oils by utilizing greater amounts of acid so that the aforementioned acidity level can be obtained. This attempt has been unsuccessful because when greater quantities of acid are utilized pH values lower than 3.5 are obtained. When this happens, the chemical acidification process whereby animal and/or vegetable fats are converted into a sour cream type product, does not occur. The final product obtained by utilizing excess amounts of acid to reach the aforementioned acidity level does not have the consistency, taste, aroma and body of a commercial fermented sour cream product.

Therefore it is an object of this invention to provide a method for producing sour cream from animal and/or vegetable fats and oils containing animal or vegetable protein by direct chemical acidification.

It is a further object of this invention to provide a cheap and economical sour cream type product and flavored dips made therefrom by direct chemical acidification of animal and/or vegetable fats and oils, containing animal or vegetable protein, said products having a consistently smooth, viscous, body and excellent flavor.

It is an object of this invention to provide sour cream products and flavored dips made therefrom from animal and/or vegetable fats and oils containing animal or vegetable protein by direct chemical acidification, wherein the sour cream type product retains its flavor, freshness and appearance for a longer period of time than many of the present commercially produced fermented sour cream products.

Further objects will become apparent from the detailed description given hereinafter.

We have discovered that sour cream type products can be prepared by direct chemical acidification from animal or vegetable fats in the following manner. First, a crude emulsion is prepared by emulsifying a fatty component in water in the presence of an edible organic emulsifying agent having a melting point below about 140° F. This fatty component can be edible fatty vegetable oils, edible hydrogenated vegetable oils, edible animal fats, edible hydrogenated fats as well as mixtures of the same. The fatty components amounts to from about 7% to 35% by weight based upon the weight of the aqueous emulsion. This crude emulsion is subsequently homogenized to form a final emulsion at pressures of from about 1,000 p.s.i.g. to about 4,000 p.s.i.g. at temperatures of from about 100° F. to 250° F. Then, if not introduced previously, an edible organic colloidal stabilizer is introduced into the final emulsion and activated by heating at temperatures of from about 140° F. to about 225° F. Following the activation of the stabilizer, acidification is carried out by introducing into the final emulsion which contains the activated stabilizer, an edible non-toxic acid or edible non-toxic-acid-liberating compound in an amount sufficient to provide a pH of from about 3.5 to about 6 and an acidity level of from about 0.5% to 1.1% by weight of said final emulsion calculated as lactic acid, while maintaining the total fat content of said final emulsion at substantially the same level which existed prior to acidification.

In addition to the foregoing, other materials are present in the final emulsion. That is, an edible non-toxic ammonium or alkali metal salt of an animal or vegetable protein which is capable of being precipitated at a pH of about 3.5 to 6 is introduced either before or after the formation of the crude emulsion, i.e., at any time prior to the homogenation of the crude emulsion. Further, one or a mixture of edible, non-toxic, water soluble ammonium or alkali metal salts of inorganic phosphates or food acceptable organic acids having from 2 to 10 carbon atoms is introduced prior to or after the formation of the crude emulsion or the final emulsion. If desired this latter material can be introduced along with the addition of the acid or acid-liberating materials. Regarding the stabilizer referred to above, it can be introduced prior to or after the formation of the crude emulsion or the final emulsion. It is only necessary that the stabilizer be introduced prior to pasteurization at which time it is activated. In this manner, sour cream type products are prepared from animal or vegetable fats that have both the proper pH and acidity level as well as the consistency, body, flavor and taste of a commercial sour cream product produced by the biological acidification of milk. Furthermore, it has been found that these products can stand for long periods of time without the danger of the acidity level falling below the range necessary to maintain the taste, body, aroma and consistency of a sour cream type product. Since no butterfat and milk solids are used, the sour cream type products of this invention are cheaper and can have a higher content of polyunsaturates than commercial sour creams which are prepared either chemically or biologically from milk. Furthermore, the presence of vegetable and/or animal fats and oils gives this product added stability and longer shelf life than most commercial sour cream products produced either chemically or biologically from milk. Additionally, the sour cream products prepared in the above manner are ideally suited for the preparation of flavored dips.

PREPARATION OF THE CRUDE EMULSION

The new and improved sour cream type products of this invention are prepared by first emulsifying a fatty substance which may be animal fats, vegetable oils, hydrogenated vegetable oils or hydrogenated animal fats or their mixtures. This crude emulsion is formed by merely adding the fatty substance to the water. The amount of the fatty substance that is added to the water should be sufficient to provide a total fat content of from about 7% to about 35% by weight based on the weight of the total emulsion. This fat content is necessary in producing a sour cream type product by the direct chemical acidification of the emulsion. If the crude emulsion contains a lower total fat content than 7%, a sour cream type product will not be produced upon direct acidification. On the other hand, if the crude emulsion contains a total fat content greater than 35% by weight, the acid which is introduced will not act upon the protein in the fat to produce a commercially acceptable sour cream type product. Hence, it is essential that the total fat content of the emulsion that is directly acidified be from about 7% to about 35% by weight of the total emulsion in order to produce sour cream type products or dips therefrom in accordance with this invention. The water which is utilized to prepare the emulsion should be present in an amount of from about 55% to about 90% by weight of the total emulsion.

In preparing the crude emulsion it is essential that one or a mixture of non-toxic edible emulsifiers having a melting point lower than 140° F. be utilized. This emulsifying agent in conjunction with the subsequent homogenation reduces the size of the particles of the fatty component to less than five microns. This reduction in size of the particles of the fatty component allows the fatty component to be subsequently acidified by the direct acidification process disclosed in Ser. No. 184,517, Edwards, filed Apr. 2, 1962, to produce a sour cream type product. If non-toxic edible emulsifiers having melting points above about 140° F. are utilized, these high melting emulsifiers, it has been found, permit the fat globules to agglomerate thus preventing the acid and stabilizer which is added during the direct acidification process from reacting with the emulsion to produce a sour cream type product. Among the many emulsifying or dispersing agents which may be utilized in accordance with this invention are the mono- and di- fatty acid esters of polyhydroxy alcohols, particularly sorbitan and glycerol, including the $C_{12}$ to $C_{24}$ saturated fatty acid esters of sorbitan and glycerol. Additionally, the polyhydroxy alcohols may be ethoxylated with ethylene oxide prior to esterification. Among the many typical emulsifying agents which may be utilized in accordance with this invention include monostearic acid ester of glycerol, distearic acid ester of glycerol, monostearic acid ester of sorbitan, monopalmitic acid ester of glycerol, dipalmitic acid ester of glycerol, monopalmitic acid ester of sorbitan, dipalmitic acid ester of sorbitan, tripalmitic acid ester of sorbitan, monomyristic acid ester of glycerol, dimyristic acid ester of glycerol, monomyristic acid ester of sorbitan, dimyristic acid ester of sorbitan, monobehenic acid ester of glycerol, dibehenic acid ester of glycerol, monobehenic acid ester of sorbitan, dibehenic acid ester of sorbitan, polyethylene oxide condensates of sorbitan esters such as polyethylene oxide condensates of sorbitan monolaurate, polyethylene oxide condensates of sorbitan monooleate and polyethylene oxide condensates of sorbitan monopalmitate. In order to achieve the results of this invention, it is necessary to add the emulsifying agent to the water or the fatty component or to the mixture of these in an amount of from about 0.01% to 1% by weight, based on the weight of the emulsion. It is of course understood that many of these emulsifiers are mixtures, some of whose components may melt at temperatures above 140° F. In such cases, it is only necessary that the melting range of the mixture of emulsifiers be less than about 140° F.

Any conventional edible vegetable oil, edible hydrogenated vegetable oil, edible conventional animal fat or hydrogenated animal fat or mixtures of the above may be utilized as the fatty component in forming the crude emulsion. Furthermore, in forming this emulsion, it is essential that the fatty component be in the form of a liquid. If solid fats are utilized, it is desirable to heat them so as to liquify them. Typical vegetable oils which may be utilized in this invention include peanut oil, coconut oil, olive oil, sesame oil, cottonseed oil, corn oil, soybean oil, sunflower oil, safflower oil, and mixtures of the above. Typical hydrogenated oils which may be utilized include hydrogenated peanut oil, hydrogenated coconut oil, hydrogenated olive oil, hydrogenated sesame oil, hydrogenated cottonseed oil, hydrogenated tallow oil, hydrogenated corn oil, hydrogenated soybean oil, hydrogenated sunflower oil, hydrogenated safflower oil, and mixtures thereof. Typical animal fats which may be utilized in the fatty phase include lard, sperm oil, tallow and mixtures thereof. Typical hydrogenated animal fats which may be utilized in the fatty phase include hydrogenated lard, hydrogenated sperm oil. hydrogenated tallow etc. In producing the emulsion in accordance with this invention, the fatty component is added to the water in an amount of from about 7% to about 35% by weight, based on the weight of the total emulsion. The water which is utilized to prepare the emulsion should comprise about 55% by weight to about 90% by weight of the emulsion.

The crude emulsion preferably should contain from about 0.5% to about 5% by weight, based upon the weight of the emulsion, of a water-soluble animal or vegetable protein capable of being precipitated at a pH of about 3.5 to about 6. The protein salt is added to the emulsion to produce the proper consistency, taste, texture and body in the final sour cream type product. It is the protein upon which the acid that is later added, acts to produce the chemically acidified sour cream type product of this invention. Any edible water-soluble animal or vegetable protein salt or their mixtures capable of being precipitated at a pH of about 3.5 to about 6 can be utilized to produce the sour cream type product in accordance with this invention. Typical edible animal or water-soluble protein salts capable of being precipitated at a pH of about 3.5 to about 6 include the ammonium and alkali metal salts of casein, soya protein, peanut protein, sesame protein, cottonseed protein, etc. These proteins are soluble in water at neutral pHs or basic pHs (ph's of about 6.5 or above), however these proteins must be capable of being precipitated at pHs of from about 3.5 to 6.

The protein can be introduced during the formation of the crude emulsion or at any time prior to homogenization. In this manner, a sour cream type product having the proper mouth feel, taste, texture and body of commercially bacterially fermented sour cream is produced. An amount of less than 0.5% by weight of the protein will not produce a commercially acceptable sour cream having the proper mouth feel, body, taste, and texture of sour cream in accordance with this invention.

HOMOGENIZATION OF THE CRUDE EMULSION

The crude emulsion of the fatty component in water is homogenized prior to the addition of the acid and after the addition of the protein salt at a pressure of 1,000 p.s.i.g. to about 4,000 p.s.i.g. at a temperature of from about 100° F. to about 250° F. in the presence of a non-toxic, edible emulsifying agent having a melting point below 140° F. already introduced. By means of homogenization as described herein, the fat globules in the emulsion are reduced in size. In this manner, the resulting particles can be directly and uniformly acidified so that a sour cream type product of uniform taste and consistency can be produced by direct acidification.

The crude emulsion can be homogenized at pressures of from about 1,000 p.s.i.g. to about 4,000 p.s.i.g. by any conventional homogenizer such as a Cherry-Burell homogenizer or a Creamery Package homogenizer. A preferred apparatus for applying this pressure is a two-stage Gaulin homogenizer, the first stage operating at a pressure of from about 1,000 p.s.i.g. to about 4,000 p.s.i.g. to break down the fat globules, and the second stage operating at a pressure of from about 400 p.s.i.g. to about 1,000 p.s.i.g. to break up any residual clumps of fat into small particles which remain in the emulsion. If desired, the total amount of pressure which is needed to break down the fat globules so that a sour cream type product can be produced in accordance with this invention, can be supplied simply by merely utilizing the first stage of the two stage homogenizer. However for best results, it is preferred that a two-stage homogenizer be utilized.

STABILIZATION OF THE EMULSION

The final emulsion contains an edible organic colloidal stabilizer. The stabilizer can be added any time during or after the formation of the crude emulsion or even after the crude emulsion is homogenized. Any conventional edible stabilizer or mixtures thereof may be utilized in the process of this invention to produce the improved sour cream type product of this invention. Typical edible, organic, colloidal stabilizers which may be utilized in this invention include gelatin, flour, tapioca flour and other hydrophillic colloids, starch, including modified starch, agar, Irish moss extract, carrageen, algin, locust bean gum, guar gum, cellulose gums, such as carboxy methyl cellulose and methyl cellulose, gum tragacanth, gum arabic, tapioca starch, pectin, corn starch, corn flour and mixtures thereof.

It is preferred that the stabilizer be added at a temperature of from about 34° F. to about 150° F. or higher so that the stabilizer can be easily and intimately introduced either in the form of a mixture, dispersion or solution throughout the fat emulsion. If lower temperatures are utilized, the emulsion may start to freeze and solidify, thus making it very difficult to achieve a uniform mixture of the stabilizer within the fat emulsion. Higher temperatures than 150° F. may be utilized in adding the stabilizer into the emulsion, but it has been found that at temperatures above about 150° F. it becomes harder to evenly admix, dissolve, disperse or otherwise intimately introduce the stabilizer. Hence, if higher temperatures are used, higher mixing speeds and longer mixing times are required to form a uniform dispersion or mixture of the stabilizer. If very high temperatures are employed, expensive equipment may have to be utilized to uniformly disperse the stabilizer throughout the emulsion.

The amount of organic stabilizer added should be at least 0.01% by weight based on the weight of the total emulsion. Any amount above 0.01% by weight of stabilizer may be utilized to produce the product of this invention. For best results, no more than 5% by weight of stabilizer, based on the weight of the emulsion, is needed to produce the sour cream type product of this invention. We have found, generally, that by adding more than 5% by weight of stabilizer based upon the weight of the emulsion, produces too thick a product which may not be desirable for general consumer purposes. The choice of the amount of stabilizer depends to a large extent upon the relative characteristics of viscosity, spreadability and the like properties desired in the finished sour cream type product, which in turn is indicated by consumer preferences in various marketing areas.

After a uniform dispersion of the stabilizer within the fatty emulsion is obtained, the emulsion is then heated to a temperature range of from about 140° F. to about 225° F. before the addition of acid so as to activate the stabilizer. By activating the stabilizer, the protein in the emulsion is prevented from separating during acidification. Furthermore, by subjecting the stabilized fatty emulsion to this temperature range, the fatty emulsion is simultaneously pasteurized while the stabilizer is activated. The stabilized fatty emulsion may be maintained at this temperature range for a period of time of from about a few seconds to about 4 hours or more. Only a short time at this temperature need be utilized, since the stabilizer is activated and the fatty emulsion is pasteurized when the stabilized fatty emulsion is subjected to a temperature range of from about 140° F. to about 225° F. for a few seconds. The activation of the stabilized fatty emulsion may take place at any time prior to the addition of the acid.

Additionally, it is necessary to incorporate from about 0.1% to about 3% by weight of the emulsion of edible, water-soluble ammonium or alkali metal salts of inorganic phosphates and edible organic acids having from about 2 to 10 carbon atoms such as citric acid, acetic acid, butyric acid, lactic acid, gluconic acid, decanoic acid, etc. and mixtures thereof. Due to the presence of these salts in the final emulsion, it is possible to produce upon the subsequent acidification of the fatty emulsion to a pH of from about 3.5 to 6 (the desired pH at which chemical acidification takes place), the proper aforementioned acidity level of sour cream. In this manner, a product that has a unique taste, body, aroma, consistency and appearance of a biologically acidified sour cream is produced. The ammonium or alkali metal salts may be added at any time prior to as well as during the acidification step. If the ammonium or alkali metal salt is added to the emulsion after the addition of acid, a sour cream type product will not be produced. This is true since by adding the salts to the emulsion after the addition of the acid, these salts cannot react with the acid to produce a commercially acceptable sour cream type product having an acidity level of from about 0.5% to about 1.1% by weight calculated as titratable lactic acid, at a pH of from about 3.5 to 6.0 It has been found that in order to produce the aforementioned beneficial results, from 0.1% to about 5% by weight based on the weight of the emulsion of a water-soluble edible ammonium or alkali metal salt should be added to the emulsion. If less than 0.1% by weight of this salt is added, there will be insufficient amounts of alkali metal or ammonium salt present to prevent the acidity from reaching the proper level of sour cream. It has been found that by adding alkali metal or ammonium salt in amounts greater than about 5%, a sour cream product may be obtained which will not be desirable for general consumer purposes. We have found that any edible water-soluble ammonium or alkali metal salt of a phosphat or an edible organic acid having from about 2 to 10 carbon atoms may be utilized in accordance with this invention. Typical water-soluble edible salts which may be utilized in this invention include ammonium phosphate, sodium phosphate, potassium phosphate, sodium citrate, potassium citrate, ammonium citrate, sodium acetate, potassium acetate, ammonium acetate, sodium gluconate, potassium gluconate, ammonium gluconate, sodium butyrate, sodium lactate, potassium lactate, ammonium lactate, sodium propionate, sodium decoate, etc. as well as mixtures of the above.

ACIDIFICATION

Acids or mixtures of acids are added to the final stabilized fatty emulsion, to bring the pH of the stabilized fatty emulsion within the range of 3.5 to 6.0 and the titratable acidity to a value of from 0.5% to 1.1% by weight of the emulsion, expressed as titratable lactic acid. The temperature at which acidification is carried out is not critical. It can be at, for example, at temperatures of from about 35° F. to 120° F., although temperatures of from about 50° F. to 80° F. are preferred. Any edible acid, acidogen, mixture of acids or acidogens or mixtures of acidogens and acids may be utilized depending upon the desired flavor. The acids that may be utilized include succinic acid, maleic acid, nitric acid, acetic acid, adipic acid, hydrochloric acid, phosphoric acid, citric acid, lactic acid, etc. and mixtures thereof. Any of the acidogens such as D-glucono-delta lactone, gamma glactono lactone, tetramethyl delta mannono lactone, tetramethyl delta glucono lactone, tetramethyl delta glactono lactone, trimethyl delta arabano lactone, tetramethyl gamma glucono lactone, and trimethyl gamma arabano lactone, which yield non-toxic acids upon slow hydrolysis may be utilized. Typical acidogens are disclosed in U.S. Patent No. 2,982,654, May 2, 1961, Hammond et al. The choice of a typical acid or an acidogen and the desired pH, as with the choice of stabilizers, depends to a large extent upon the relative characteristics of viscosity, spreadability, and the like properties desired in the finished product, which in turn are indicated by consumer preferences in various marketing areas. The acid or acidogen or mixtures thereof should be added in solid form where possible, or in concentrated solutions so as not to dilute or decrease the fat content of the emulsion thus preventing the formation of the product.

In preparing dips from this sour cream type product produced in accordance with the direct chemical acidification process, a dip flavor is generally added to the sour cream. This dip flavor may be added after the activation of the stabilizer and prior to the acidification step or after the acidification step is completed. Typical dip flavors include French onion, chive, bleu cheese, cheddar cheese, Roquefort cheese, barbeque sauce, vegetable flavorants, fruit flavorants, etc. In preparing a dip, from about 0.01% to about 10.0% by weight of the emulsion of a dip flavor may be added. The dip flavor may be added to the fatty emulsion at anytime after the acidification step or prior to the acidification step.

By the term, without substantially lowering the fat content, as used herein, we mean that the total fat content of the emulsion that is used to prepare the chemically fermented sour cream type product is not lowered more than about 3% by weight, based on the weight of the original fat content during the acid addition and before the subsequent formation of the chemically fermented sour cream type product. In this manner, the total fat content of the emulsion is not diluted during the acidification step.

By the term, acidity level, as used throughout the specification and claims, we mean that amount of acid present in the acidified product that is titrated with sodium hydroxide to bring the acidfied product to a phenolphthalein end point, assuming the product is totally acidfied with lactic acid. The acidity level is given in terms of percent, i.e., 100 x the weight of titratable lactic acid in a given weight of a product divided by the given weight of the product.

The following examples further illustrate the present invention, however they are not to be construed in a limiting sense. In the following examples the acidity level was determined and calculated by the following method.

Nine grams of the final acidified product was placed in a breaker. Then, four drops of phenolphthalein were added under constant stirring. This mixture had a milky white color. 0.1 normal sodium hydroxide was titrated into this mixture from a burette. The sodium hydroxide was added until the color of the mixture changed from milky white to faint pink. As soon as the color of the mixture changed, the amount in milliliters (mls.) of sodium hydroxide which was added to the mixture was read from the burette. The acidity level in percent, assuming all of the acid is lactic acid, was calculated from the following formula, which is set forth on page 42 of the "Manual for Dairy Manufacturing Short Courses," Penn State University Dairy Dept. (1956)—published by Curtz Brothers, Clearfield, Pa.:

Acidity level (percent)=

$$\frac{(\text{mls. of 0.1 N sodium hydroxide added}) (0.009) (100)}{\text{wt. of sample in grams}}$$

Example I

A liquid fatty mixture was prepared by mixing at a temperature of about 140° F., 540 grams of molten coconut oil (having a melting point of 92° F.) and 2.55 grams of polyoxyethylene sorbitan monostearate (a condensate of 20 mols of ethylene oxide with one mole of sorbitan monostearate). To this liquid fatty mixture, there was added a solid mixture consisting of 0.45 grams of sorbitan monostearate, 180 grams of corn syrup solids as a filler, 100 grams of sodium caseinate as the protein salt, 37.5 grams of a stabilizer consisting of 33 grams of tapioca flour and 4.5 grams of vegetable gums and 15.15 grams of a mixture of potassium salt, consisting of 4.5 grams of monopotassium phosphate and 10.65 grams of dipotassium phosphate, while maintaining the temperature at about 140° F. After the solid particles and the liquid fatty mixture were thoroughly mixed, the total mixture was cooled to 125° F. At this temperature, 2,125 grams of water was added to the total mixture so as to form a crude emulsion. This emulsion was stirred for five minutes at this temperature to uniformly disperse the liquid fatty mixture into the water. After this period, the crude emulsion was passed through a two-stage homogenizer, having its first stage operating at 1,500 p.s.i.g. and its second stage operating at 500 p.s.i.g., while the temperature of the emulsion was maintained at from about 120° F. to about 130° F. After being passed through the two-stage homogenizer, the resulting final emulsion was heated directly to 180° F. and maintained at this temperature for 15 minutes, in order to activate the stabilizer and pasteurize the milk. After this period the emulsion was cooled to a temperature of 50° F.

To one quart of the fatty emulsion prepared above there was added, at a temperature of about 50° F., a mixture consisting of 3.71 cc. of an 80% by weight aqueous solution of lactic acid, 1.63 milliliters of a 50% by weight aqueous solution of citric acid, 0.4 cc. of glacial acetic acid and 0.2 cc. of starter distillate. The pH of the resultant mixture was 4.3. After mixing for one minute, a thick, viscous sour cream type product was produced. The product had uniform smoothness and no off-flavors were detected. The product was packaged and allowed to stand overnight at a temperature of 40° F. The next day the plummet value of the sour cream product was 9.0, the pH was 4.3, and the acidity level was 0.67%.

Example II

A liquid fatty mixture was prepared by mixing at a temperature of about 140° F., 540 grams of molten coconut oil (having a melting point of 92° F.), and 1.23 grams of polyoxyethylene sorbitan monolaurate (a condensate of 20 mols of ethylene oxide with one mole of sorbitan monolaurate). To this liquid fatty mixture, there was added a solid mixture consisting of 1.77 grams of sorbitan monolaurate, 180 grams of corn syrup solids as a filler, 100 grams of sodium caseinate as the protein salt, 37.5 grams of a stabilizer consisting of 33 grams of tapioca flour and 4.5 grams of vegetable gums, and 15.15 grams of a mixture of potassium salt, consisting of 4.5 grams of monopotassium phosphate and 10.65 grams of dipotassium phosphate, while maintaining the temperature at about 140° F. After the solid particles and the liquid fatty mixture were thoroughly mixed, the total mixture was cooled to 125° F. At this temperature, 2,125 grams of water were added to the mixture so as to form a crude emulsion. This emulsion was stirred for five minutes at this temperature to uniformly disperse the liquid fatty mixture into water. After this period, the crude emulsion was passed through a two-stage homogenizer, having its first stage operating at 1,500 p.s.i.g. and its second stage operating at 500 p.s.i.g., while the temperature of the emulsion was maintained at from about 120° F. to about 130 F. After being passed through the two-stage homogenizer, the resulting final emulsion was heated directly to 180° F. and maintained at this temperature for 15 minutes, in order to activate the stabilizer and pasteurize the milk. After this period the final emulsion was cooled to a temperature of 50° F.

To one quart of the fatty emulsion prepared above there was added at a temperature of about 50° F. a mixture consisting of 3.71 cc. of an 80% by weight aqueous solution of lactic acid, 1.63 milliliters of a 50% by weight aqueous solution of citric acid, 0.4 cc. of glacial acetic acid and 0.2 cc. of starter distillate. The pH of the resultant mixture was 4.3. After mixing for one minute a thick, viscous sour cream type product was produced. The product had uniform smoothness and no off-flavors were detected. The product was packaged and allowed to stand overnight at a temperature of 40° F. The next day the plummet value of the sour cream type product was 9.0, the pH was 4.3 and the acidity level was 0.67%.

Example III

A liquid fatty mixture was prepared by mixing at a temperature of about 140° F., 540 grams of molten coconut oil (having a melting point of 92° F.) and 1.77 grams of polyoxyethylene sorbitan monopalmitate (a condensate of 20 mols of oxide with one mole of sorbitan monopalmitate). To this liquid fatty mixture there was added a solid mixture consisting of 1.23 grams of sorbitan monopalmitate, 180 grams of corn syrup solids as a filler, 100 grams of sodium caseinate as the protein salt and 37.5 grams of a stabilizer consisting of 33 grams of tapioca flour and 4.5 grams of vegetable gums and 15.15 grams of a mixture of potassium salt consisting of 4.5 grams of monopotassium phosphate and 10.65 grams of dipotassium phosphate, while maintaining the temperature at about 140° F. After the solid particles and the liquid fatty mixture were thoroughly mixed, the total mixture was cooled to 125° F. At this temperature, 2,125 grams of water were added to the mixture so as to form a crude emulsion. This emulsion was stirred for five minutes at this temperature to uniformly disperse the liquid fatty mixture into the water. After this period, the crude emulsion was passed through a two-stage homogenizer, having its first stage operating at 1,500 p.s.i.g. and its second stage operating at 500 p.s.i.g., while the temperature of the emulsion was maintained at from about 120° F. to about 130° F. After being passed through a two-stage homogenizer, the resulting final emulsion was heated directly to 180° F. and maintained at this temperature for 15 minutes, in order to activate the stabilizer and pasteurize the milk. After this period the final emulsion was cooled to a temperature of 50° F.

To one quart of the fatty emulsion prepared above there was added at a temperature of about 50° F. a mixture consisting of 3.71 cc. of an 80% by weight aqueous solution of citric acid, 0.4 cc. of glacial acetic acid and 0.2 cc. of starter distillate. The pH of the resultant mixture was 4.3. After mixing for one minute a thick, viscous sour cream type product was produced. The product had uniform smoothness and no off-flavors were detected. The product was packaged and allowed to stand overnight at a temperature of 40° F. The next day the plummet value of the sour cream product was 9.0, the pH was 4.3 and the acidity level was 0.67%.

Example IV

A liquid fatty mixture was prepared by mixing at a temperature of about 140° F., 540 grams of molten coconut oil (having a melting point of 92° F.) and 2.16 grams of polyoxyethylene sorbitan monooleate (a condensate of 20 mols of ethylene oxide with one mole of sorbitan monooleate). To this liquid fatty mixture, there was added a solid mixture of 0.84 grams of sorbitan monooleate, 180 grams of corn syrup solids as a filler, 100 grams of sodium caseinate as the protein salt, 37.5 grams of a stabilizer mixture consisting of 33 grams of tapioca flour and 4.5 grams of vegetable gums and 15.15 grams of a mixture of potassium salt consisting of 4.5 grams of monopotassium phosphate and 10.65 grams of dipotassium phosphate, while maintaining the temperature at about 140° F. After the solid particles and the liquid fatty mixture were thoroughly mixed, the total mixture was cooled to 125° F. At this temperature 2,125 grams of water were added to the mixture so as to form a crude emulsion. The emulsion was stirred for five minutes at this temperature to uniformly disperse the liquid fatty mixture into the water. After this period, this emulsion was passed through a two-stage homogenizer, having its first stage operating at 1,500 p.s.i.g. and its second stage operating at 500 p.s.i.g. while the temperature of the crude emulsion was maintained at from about 120° F. to about 130° F. After being passed through a two-stage homogenizer, the resulting final emulsion was heated directly to 180° F. and maintained at this temperature for 15 minutes, in order to activate the stabilizer and pasteurize the milk. After this period the final emulsion was cooled down to a temperature of 50° F.

To one quart of the fatty emulsion prepared above there was added at a temperature of about 50° F. a mixture consisting of 3.71 cc. of an 80% by weight aqueous solution of lactic acid, 1.63 milliliters of a 50% by weight aqueous solution of citric acid, 0.4 cc. of glacial acetic acid and 0.2 cc. of starter distillate. The pH of the resultant mixture was 4.3. After mixing for one minute a thick, viscous sour cream type product was produced. The product had uniform smoothness and no off-flavors were detected. The product was packaged and allowed to stand overnight at a temperature of 40° F. The next day the plummet value of the sour cream product was 9.0, the pH was 4.3 and the acidity level was 0.67%.

Example V

A liquid fatty mixture was prepared by mixing at a temperature of about 140° F., 540 grams of molten coconut oil (having a melting point of 92° F.) and 1.59 grams of polyoxyethylene sorbitan monostearate (a condensate of 20 mols of ethylene oxide with one mole of sorbitan monostearate). To this liquid fatty mixture there was added a solid mixture consisting of 1.14 grams of sorbitan monolaurate, 180 grams of corn syrup solids as a filler, 100 grams of sodium caseinate as the protein salt, a stabilizer mixture consisting of 33 grams of tapioca flour and 4.5 grams of vegetable gums and 15.15 grams of a mixture of potassium salt, consisting of 4.5 grams of monopotassium phosphate and 10.65 grams of dipotassium phosphate, while maintaining the temperature at about 140° F. After the solid particles and the liquid fatty mixture were thoroughly mixed, the total mixture was cooled to 125° F. At this temperature, 2,125 grams of water were added to the mixture so as to form a crude emulsion. This emulsion was stirred for five minutes at this temperature to uniformly disperse the liquid fatty mixture into water. After this period, the crude emulsion was passed through a two-stage homogenizer, having its first stage operating at 1,500 p.s.i.g. and its second stage operating at 500 p.s.i.g., while the temperature of the emulsion was maintained at from about 120° F. to about 130° F. After being passed through the two-stage homogenizer, the resulting final emulsion was heated directly to 180° F. and maintained at this temperature for 15 minutes, in order to activate this stabilizer and pasteurize the milk. After this period, the final emulsion was cooled to a temperature of 50° F.

To one quart of the fatty emulsion prepared above there was added at a temperature of about 50° F. a mixture consisting of 3.71 cc. of an 80% by weight aqueous solution of lactic acid, 1.63 milliliters of a 50% by weight aqueous solution of citric acid and 0.4 cc. of glacial acetic acid and 0.2 cc. of starter distillate. The pH of the resultant mixture was 4.3. After mixing for one minute a thick, viscous sour cream type product was produced. The product had uniform smoothness and no off-flavors were detected. The product was packaged and allowed to stand overnight at a temperature of 40° F. The next day the plummet value of the sour cream product was 9.0, the pH was 4.3 and the acidity level was 0.67%.

Example VI

A liquid fatty mixture was prepared by mixing at a temperature of about 140° F., 540 grams of molten coconut oil (having a melting point of 92° F.) and 2.55 grams of polyoxyethylene sorbitan monostearate (a condensate of 20 mols of ethylene oxide with one mole of sorbitan monostearate). To this liquid fatty mixture, there was added a solid mixture consisting of 0.45 gram of sorbitan monostearate, 180 grams of corn syrup solids as a filler, 100 grams of sodium caseinate as the protein salt and a stabilizer consisting of 33 grams of tapioca flour and 4.5 grams of vegetable gums and 7.57 grams of a mixture of potassium salt consisting of 2.25 grams of monopotassium phosphate and 5.32 grams of dipotassium phosphate, while maintaining the temperature at about 140° F. After the solid particles and the liquid fatty mixture were thoroughly mixed, the total mixture was cooled to 125° F. At this temperature, 2,125 grams of water was added to the total mixture so as to form a crude emulsion. This emulsion was stirred for five minutes at this temperature to uniformly disperse the liquid fatty mixture into water. After this period, the crude emulsion was passed through a two-stage homogenizer, having its first stage operating at 1,500 p.s.i.g. and its second stage operating at 500 p.s.i.g., while the temperature of the emulsion was maintained at from about 120° F. to about 130° F. After being passed through a two-stage homogenizer, the resulting final emulsion was heated directly to 180° F. and maintained at this temperature for 15 minutes, in order to activate the stabilizer and pasteurize the milk. After this period the final emulsion was cooled to a temperature of 50° F.

To one quart of the fatty emulsion prepared above there was added at a temperature of about 50° F. a mixture consisting of 3.71 cc. of an 80% by weight aqueous solution of lactic acid, 1.63 milliliters of a 50% by weight aqueous solution of citric acid, 0.4 cc. of glacial acetic acid and 0.2 cc. of starter distillate. The pH of the resultant mixture was 4.3. After mixing for one minute, a thick, viscous sour cream type product was produced. The product had uniform smoothness and no off-flavor were detected. The product was packaged and allowed to stand overnight at a temperature of 40° F. The next day the plummet value of the sour cream product was 9.0, the pH was 4.3 and the acidity level was 0.49%.

Example VII

A liquid fatty mixture was prepared by mixing at a temperature of about 140° F., 540 grams of molten coconut oil (having a melting point of 92° F.) and 1.43 grams of Myverol 18–85 [1]. To this liquid fatty mixture, there was added a solid mixture consisting of 0.65 gram of Myverol 18–07 [2].

0.41 gram of lecithin, 180 grams of corn syrup solids, 100 grams of sodium caseinate as a protein salt and a stabilizer mixture consisting of 33 grams of tapioca flour and 4.5 grams of vegetable gums and 15.15 grams of a mixture of potassium salt, consisting of 4.5 grams of monopotassium phosphate and 10.65 grams of dipotassium phosphate, while maintaining the temperature at about 140° F. After the solid particles and the liquid fatty mixture were thoroughly mixed, the total mixture was cooled to 125° F. At this temperature, 2,125 grams of water was added to the total mixture so as to form a crude emulsion. This emulsion was stirred for five minutes at this temperature to uniformly disperse the liquid fatty mixture into the water. After this period, the crude emulsion was passed through a two-stage homogenizer, having its first stage operating at 1,500 p.s.i.g. and its second stage operating at 500 p.s.i.g., while the temperature of the emulsion was maintained at from about 120° F. to about 130° F. After being passed through the two-stage homogenizer, the resulting final emulsion was heated directly to 180° F., and maintained at this temperature for 15 minutes, in order to activate the stabilizer and pasteurize the milk. After this period the emulsion was cooled down to a temperature of 50° F.

To one quart of the fatty emulsion prepared above there was added at a temperature of about 50° F. a mixture consisting of 3.71 cc. of an 80% by weight aqueous solution of lactic acid, 1.63 milliliters of a 50% by weight aqueous solution of citric acid, 1.4 cc. of glacial acetic acid and 0.2 cc. of starter distillate. The pH of the resultant mixture was 4.3. After mixing for one minute a thick, viscous sour cream type product was produced. The product had uniform smoothness and no off-flavors were detected. The product was packaged and allowed to stand overnight at a temperature of 40° F. The next day the plummet value of the sour cream product was 9.0, the pH was 4.3 and the acidity level was 0.67%.

Example VIII

This example is directed to the production of a chemically acidified product without utilizing any alkali metal salts.

A liquid fatty mixture was prepared by mixing at a temperature of about 140° F., 540 grams of molten coconut oil (having a melting point of 92° F.), 2.55 grams of polyoxyethylene sorbitan monostearate (a condensate of 20 mols of ethylene oxide with one mole of sorbitan monostearate). To this liquid fatty mixture there was added a solid mixture consisting of 0.45 gram of sorbitan monostearate, 180 grams of corn syrup solids as a filler, 100 grams of sodium caseinate as the protein salt and a stabilizer mixture consisting of 33 grams of tapioca flour and 4.5 grams of vegetable gums, while maintaining the temperature at about 140° F. After the solid particles and the liquid fatty mixture were thoroughly mixed, the total mixture was cooled at 125° F. At this temperature, 2,125 grams of water was added to the total mixture so as to form a crude emulsion. This emulsion was stirred for five minutes to uniformly disperse the liquid fatty mixture into the water. After this period, the crude emulsion was passed through a two-

---

[1] A mixture of glyceride esters consisting of about 90% by weight of a mixture of 18 carbon atom fatty acid mono glyceride esters and about 10% by weight of distilled 18 carbon atom fatty acid diglyceride esters, said mixture having an iodine value of 85.

[2] A mixture if fatty acid esters consisting of 90% by weight of distilled 18 carbon atom fatty acid mono glyceride esters and 10% by weight of the distilled 18 carbon atom fatty acid diglyceride esters, said mixture having an iodine value of 7.0.

stage homogenizer, having its first stage operating at 1,500 p.s.i.g. and its second stage operating at 500 p.s.i.g. while the temperature of the emulsion was maintained at from about 120° F. to about 130° F. After being passed through the two-stage homogenizer, the resulting final emulsion was heated directly to 180° F. and maintained at this temperature for 15 minutes, in order to activate this stabilizer and pasteurize the milk. After this period the emulsion was cooled down to a temperature of 50° F.

To one quart of the fatty emulsion prepared above there was added at a temperature of about 50° F. a mixture consisting of 1.86 cc. of an 80% by weight aqueous solution of lactic acid, 0.82 milliliter of a 50% by weight aqueous solution of citric acid, 0.2 gram of glacial acetic acid and 0.1 cc. of starter distillate. The pH of the resultant mixture was 4.3. This product was mixed for one minute. The product was then packaged and allowed to stand overnight at a temperature of 40° F. After the next day the plummet value of this product was 9.0, the pH was 4.3 and the acidity level was 0.33%. This acidity level was far below the acidity level which is necessary for a sour cream type product.

Having described our invention, what we claim is new and desire to secure by Letters Patent is:

1. A process for preparing a chemically-fermented sour cream type product comprising the following steps:
    (a) preparing a crude emulsion by emulsifying in liquid form a fatty component selected from the group consisting of edible fatty vegetable oils, edible hydrogenated vegetable oils, edible animal fats, edible hydrogenated animal fats and mixtures thereof into water in the presence of an edible organic emulsifying agent having a melting point below about 140° F., said fatty component being present in said emulsion in an amount of from about 7% to about 35% by weight of said emulsion,
    (b) homogenizing said emulsion at a pressure of at least 1000 p.s.i.g. while heating said emulsion at a temperature of from about 100° F. to about 250° F., and
    (c) adding to the resulting final emulsion at least one compound selected from the group consisting of non-toxic edible acids, non-toxic acidogens which are capable of forming non-toxic acids upon slow hydrolysis and mixtures thereof, said addition being carried out without substantially diluting the fat content of said emulsion, said compound being added in an amount sufficient to produce in said emulsion a pH of from about 3.5 to about 6 and a titratable acidity of from about 0.5% to about 1.1% calculated as lactic acid,
said emulsion having introduced therein prior to said step of homogenizing, a protein selected from the group consisting of edible water-soluble ammonium salts of animal proteins, edible water-soluble ammonium salts of vegetable proteins, edible water-soluble alkali metal salts of animal proteins, edible water-soluble alkali metal salts of vegetable protein and mixtures thereof, said protein being present in said emulsion in an amount of 0.5% to 5% by weight based on the weight of said emulsion and said protein being capable of being precipitated at a pH of about 3.5 to 6, said emulsion having an edible organic colloidal stabilizer intimately introduced therein prior to the addition of said compound in an amount of at least about 0.01% by weight of said emulsion, said organic stabilizer being activated by heating said emulsion at temperatures of from about 140° F. to 225° F., said emulsion having added therein prior to and including the step of adding said compound, a water-soluble edible salt selected from the group consisting of ammonium salts of inorganic phosphates, alkali metal salts of inorganic phosphates, ammonium salts of food acceptable organic acids having from about 2 to about 10 carbon atoms, alkali metal salts of food acceptable organic acids having from about 2 to 10 carbon atoms and mixtures thereof.

2. The process of claim 1, wherein said salt is a mixture of sodium monophosphate and sodium diphosphate.

3. The process of claim 1, wherein said compound is a mixture of citric acid, lactic acid and acetic acid.

4. The process of claim 1, wherein said emulsifier is selected from the group consisting of mono- and di-fatty acid esters of sorbitan, mono- and di-fatty acid esters of glycerol and ethoxylates thereof.

5. The process of claim 1 wherein said emulsifier is an ethoxylate of fatty acid esters of sorbitan.

6. The process of claim 1 wherein said emulsifier is polyoxyethylene(20)sorbitan monostearate.

7. The process of claim 1 wherein said organic stabilizer is activated by heating to a temperature of about 180° F.

References Cited

UNITED STATES PATENTS

| | | | |
|---|---|---|---|
| 3,378,375 | 4/1968 | Little | 99—59 |
| 3,391,002 | 7/1968 | Little | 99—54 |
| 2,407,027 | 9/1946 | Mason | 99—63 |
| 3,359,116 | 12/1967 | Little | 99—144 XR |

OTHER REFERENCES

Altschull, Processed Plant Foods, Academic Press Inc., New York (1958), p. 409.

LIONEL M. SHAPIRO, *Primary Examiner*.

J. M. HUNTER, *Assistant Examiner*.

U.S. Cl. X.R.

99—54

Disclaimer 3,437,494.—*Ira Loter*, Fair Lawn, and *John E. Long*, Murray Hill, N.J. PROCESS FOR MAKING CHEMICALLY-ACIDIFIED SOUR CREAM TYPE PRODUCT. Patent dated Apr. 8, 1969. Disclaimer filed Feb. 13, 1978, by the assignee, *Diamond Shamrock Corporation*.

Hereby enters this disclaimer to claims 1, 4 and 7 of said patent.

[*Official Gazette April 18, 1978.*]